(12) United States Patent
Lee et al.

(10) Patent No.: US 8,254,456 B2
(45) Date of Patent: Aug. 28, 2012

(54) METHOD AND APPARATUS FOR ENCODING VIDEO AND METHOD AND APPARATUS FOR DECODING VIDEO

(75) Inventors: Kyo-Hyuk Lee, Yongin-si (KR); Sang-rae Lee, Suwon-si (KR); Duck-yeon Kim, Suwon-si (KR); Tammy Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1109 days.

(21) Appl. No.: 11/961,173

(22) Filed: Dec. 20, 2007

(65) Prior Publication Data
US 2008/0181309 A1 Jul. 31, 2008

(30) Foreign Application Priority Data
Jan. 29, 2007 (KR) .................. 10-2007-0008967

(51) Int. Cl.
H04N 7/50 (2006.01)
H04N 7/26 (2006.01)
(52) U.S. Cl. ............................. 375/240.16; 375/240.12

(58) Field of Classification Search ............. 375/240.12, 375/240.16
See application file for complete search history.

(56) References Cited

U.S. PATENT DOCUMENTS

| 5,608,458 | A | 3/1997 | Chen et al. | |
|---|---|---|---|---|
| 6,983,018 | B1* | 1/2006 | Lin et al. | ................... 375/240.16 |
| 7,088,772 | B2 | 8/2006 | Kim et al. | |
| 2003/0095603 | A1* | 5/2003 | Lan et al. | ................... 375/240.17 |
| 2006/0039470 | A1 | 2/2006 | Kim et al. | |
| 2009/0290643 | A1* | 11/2009 | Yang | ................... 375/240.16 |

FOREIGN PATENT DOCUMENTS
EP 1453322 A1 9/2004
* cited by examiner

*Primary Examiner* — Yemane Mesfin
*Assistant Examiner* — Wanda Z Russell
(74) *Attorney, Agent, or Firm* — Sughrue Mion, PLLC

(57) ABSTRACT

A method of and apparatus for encoding and decoding an image are provided. According to the method and apparatus, a virtual motion vector is assigned to a block which is encoded in intra prediction mode, and when a motion vector of a block which is encoded in inter prediction mode after the intra block is decoded, the virtual motion vector assigned to the intra block is used.

17 Claims, 6 Drawing Sheets

METHOD AND APPARATUS FOR ENCODING VIDEO AND METHOD AND APPARATUS FOR DECODING VIDEO

CROSS-REFERENCE TO RELATED PATENT APPLICATIONS

This application claims priority from Korean Patent Application No. 10-2007-0008967, filed on Jan. 29, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to encoding and decoding an image, and more particularly, to encoding and decoding an image, in which a virtual motion vector is assigned to a block which is encoded in intra prediction mode, and when a motion vector of a block which is encoded in inter prediction mode after the intra block is encoded, the virtual motion vector assigned to the intra block is used.

2. Description of the Related Art

When moving pictures are encoded, spatial redundancy and temporal redundancy in the image sequence can be removed, thereby compressing the corresponding data.

In order to remove temporal redundancy, by using another picture, positioned before or after a picture which is currently encoded, as a reference picture, an area of the reference picture similar to an area currently being encoded in the current picture is searched for and a motion vector is generated. Then, motion compensation using the generated motion vector is performed, and the difference (residue) between a prediction image obtained through the motion compensation and the current image is encoded.

In order to decode a current block encoded in inter prediction mode, information on a motion vector indicating the positional difference between the current block and a similar block in the reference picture is required. Accordingly, when encoding is performed, the information on the motion vector is encoded and inserted into a bit stream. However, if information on the motion vector of each block obtained by dividing an image is encoded directly, overhead increases, and the compression ratio may be lowered.

Since motion vectors of neighboring blocks generally have high correlation, a motion vector of a block which is encoded in inter prediction mode (hereinafter referred to as an "inter block") can be predicted from motion vectors of neighboring blocks. Therefore, according to a related art technology, a motion vector of an inter block is predicted from motion vectors of neighboring inter blocks, and the differential value between the prediction motion vector and the original motion vector is encoded for transmission, thereby compressing information on the motion vector.

FIGS. 1A and 1B are diagrams illustrating a method of predicting a motion vector according to a related art technology.

Referring to FIG. 1A, it is assumed that a block D 11 which is currently being encoded, a block A 12 to the left of the block D 11, a block B 13 above the block D 11, and a block C 14 above and to the right of the block D 11 are all inter blocks and have motion vectors, MVd, MVa, MVb, and MVc, respectively. In this case, a prediction motion vector (MVd') is calculated from motion vectors (MVa, MVb, and MVc) of neighboring inter blocks A, B, and C 12 through 14. For example, as a prediction motion vector (MVd') of the current inter block D 11, the median value of the motion vectors (MVa, MVb, and MVc) of the neighboring inter blocks 12 through 14 can be used. Then, the differential motion vector between the original motion vector (MVd) and the prediction motion vector (MVd') of the current inter block D 11 is calculated and this differential motion vector is encoded as motion information of the current inter block D 11, and transferred to a decoding end.

However, according to the related art technology, when the neighboring blocks of a current inter block are all blocks which are encoded in intra prediction mode (hereinafter referred to as "intra blocks"), the neighboring intra blocks do not have any motion information, and thus the motion vector of the current inter block is encoded directly and transmitted. Referring to FIG. 1B, when neighboring blocks 16 through 18 which are encoded before a current inter block D 15, are all intra blocks, a motion vector (MVd) of the current inter block D 15 is directly encoded and transmitted. According to the related art technology, when intra blocks exist neighboring an inter block, the correlation with neighboring areas cannot be fully used for encoding of a motion vector of the inter block.

SUMMARY OF THE INVENTION

The present invention provides a method of and apparatus for encoding and decoding an image, by which a virtual motion vector using information on neighboring areas is assigned to an intra block, and when motion information of an inter block is encoded, the virtual motion vector information of the intra block is used, thereby improving encoding efficiency of image data.

According to an aspect of the present invention, there is provided a method of encoding an image including: generating a virtual motion vector of an intra block which is encoded by intra prediction, by using motion information of an area neighboring the intra block; and encoding a motion vector of an inter block which is encoded by inter prediction after the intra block is encoded, by using the virtual motion vector of the intra block.

According to another aspect of the present invention, there is provided an apparatus for encoding an image including: a virtual motion vector generation unit generating a virtual motion vector of an intra block which is encoded by intra prediction, by using motion information of an area neighboring the intra block; and a motion vector information generation unit encoding a motion vector of an inter block which is encoded by inter prediction after the encoding of the intra block, by using the virtual motion vector of the intra block.

According to another aspect of the present invention, there is provided a method of decoding an image including: reading prediction mode information in an input bitstream and determining a prediction mode of a current block which is being decoded; if the determination result indicates that the current block is an intra block encoded by intra prediction, generating a virtual motion vector of the current block, by using motion information of an area neighboring the current block; and restoring an inter block which is decoded by inter prediction after the current block is decoded, by using the virtual motion vector of the current block.

According to another aspect of the present invention, there is provided an apparatus for decoding an image including: a prediction mode determination unit reading prediction mode information in an input bitstream and determining a prediction mode of a current block which is being decoded; a virtual motion vector generation unit, generating, if the determination result indicates that the current block is an intra block encoded by intra prediction, a virtual motion vector of the current block, by using motion information of an area neighboring the current block; and a motion information restoration unit restoring an inter block which is decoded by inter prediction after the current block is decoded, by using the virtual motion vector of the current block.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS

The present invention will now be described more fully with reference to the accompanying drawings, in which exemplary embodiments of the invention are shown.

Figure 1A:
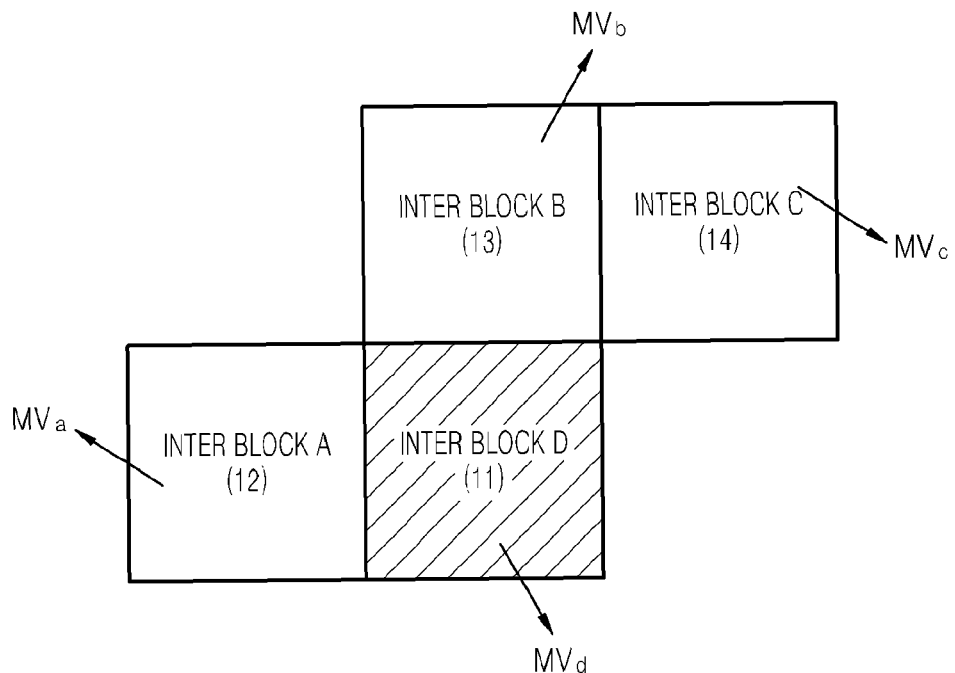
FIGS. 1A and 1B are diagrams illustrating a method of predicting a motion vector according to a relate art technology.
Figure 1B:
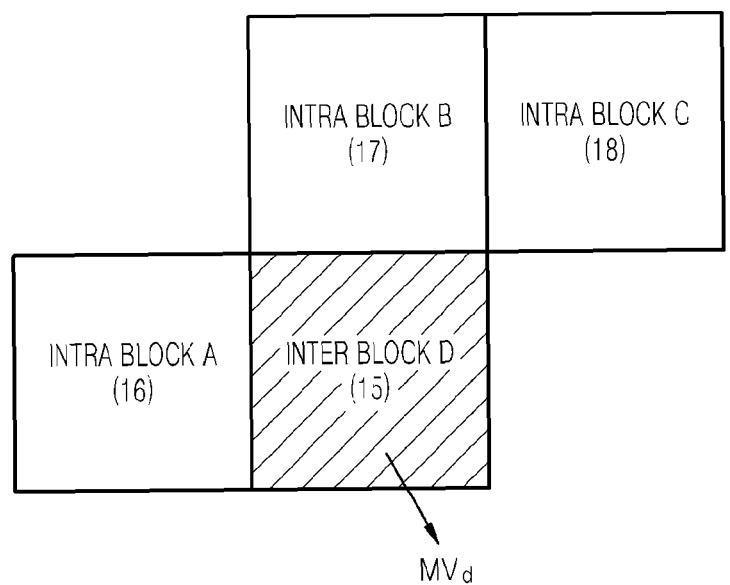
Figure 2:
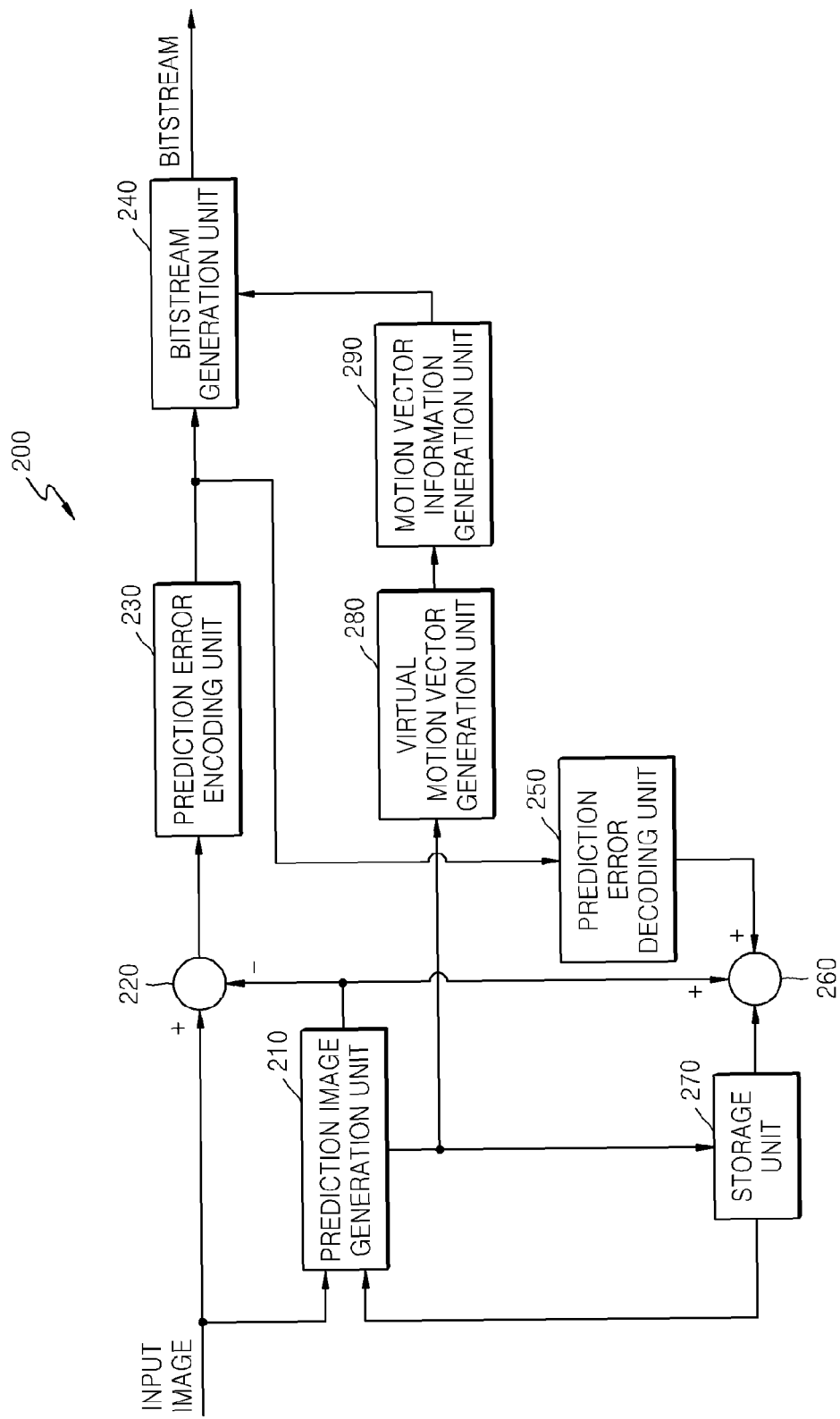
FIG. 2 is a block diagram illustrating a structure of an apparatus for encoding an image according to an exemplary embodiment of the present invention.

According to a method of and apparatus for encoding and decoding an image of the present invention, a virtual motion vector using information on neighboring areas is assigned to an intra block and stored, and the virtual motion vector of the intra block is used as one of motion vectors of neighboring blocks which are used when a prediction motion vector of an inter block is generated, FIG. 2 is a block diagram illustrating a structure of an apparatus for encoding an image according to an exemplary embodiment of the present invention.

Referring to FIG. 2, the apparatus for encoding an image according to the current exemplary embodiment includes a prediction image generation unit 210, a subtraction unit 220, a prediction error encoding unit 230, a bitstream generation unit 240, a prediction error decoding unit 250, an addition unit 260, a storage unit 270, a virtual motion vector generation unit 280, and a motion vector information generation unit 290.

The prediction image generation unit 210 divides an input image into blocks of a predetermined size, and performs inter prediction and intra prediction in relation to each block, thereby generating a prediction block of each block of the input image. The prediction image generation unit 210 performs inter prediction, by motion estimation generating a motion vector indicating an area similar to a current block, in a predetermined searching scope of a reference picture, and, through a motion compensation process, obtains area data of the reference picture indicated by the motion vector and generates a prediction block of the current block. Also, the prediction image generation unit 210 performs intra prediction generating a prediction block, by using data of blocks neighboring the current block. For inter prediction and intra prediction, a method which is used in an image compression standard draft according to a related art technology such as H.264, can be used.

If the prediction block of the current block is generated by inter prediction and intra prediction, the subtraction unit 220 subtracts the pixel values of the prediction block from the original pixel values of the current block, thereby generating a residue corresponding to a prediction error. The prediction error encoding unit 230 transforms the generated residue into the frequency domain and quantizes the transformed residue.

The prediction error decoding unit 250 performs inverse quantization and inverse transform of the transformed and quantized residue, and the inverse transformed residue is added to the prediction block, which is generated in the prediction image generation unit 210. In this way, data is restored and stored in the storage unit 270, which is used for prediction of a next block.

The virtual motion vector generation unit 280 generates a virtual motion vector by using motion information of an area neighboring an intra block, and assigns the generated virtual motion vector to the intra block. According to a related art technology, when an intra block is encoded, only residue information which is the difference between the intra block and a prediction block predicted from neighboring blocks in the same picture is encoded without a process of generating a separate motion vector. However, in the exemplary embodiment of the present invention, in order to utilize a virtual motion vector as motion information of an inter block which is encoded after an intra block, though the virtual motion vector is not directly used for encoding of the intra block, a virtual motion vector is also assigned to the intra block.

Figure 3:
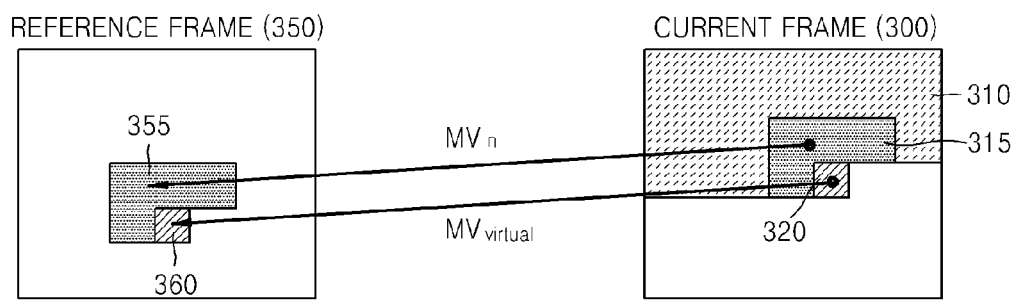
FIG. 3 is a diagram illustrating an example of generating a virtual motion vector assigned to an intra block according to an exemplary embodiment of the present invention.

FIG. 3 is a diagram illustrating an example of generating a virtual motion vector assigned to an intra block according to an exemplary embodiment of the present invention. In FIG. 3, reference number 320 indicates an intra block which is currently encoded by using intra prediction, and reference number 315 indicates an area neighboring the intra block 320, which is encoded and restored before the intra block 320.

Referring to FIG. 3, the virtual motion vector generation unit 280 performs motion estimation of the area 315 neighboring the intra block 320 of a current frame 300, and determines a motion vector ($MV_n$) indicating an area 355 of a reference frame 350, which is similar and corresponds to the neighboring area 315. The virtual motion vector generation unit 280 determines without change the determined motion vector ($MV_n$) of the neighboring area 315 as a virtual motion vector ($MV_{virtual}$) of the intra block 320. That is, the virtual motion vector generation unit 280 determines the motion vector having the same magnitude and direction as those of the neighboring area 315, as the virtual motion vector ($MV_{virtual}$) of the intra block 320. As will be explained later, the determined virtual motion vector ($MV_{virtual}$) of the intra block 320 can be used as one of neighboring motion vectors that will be used for predicting a motion vector of a next inter block.

Figure 4:
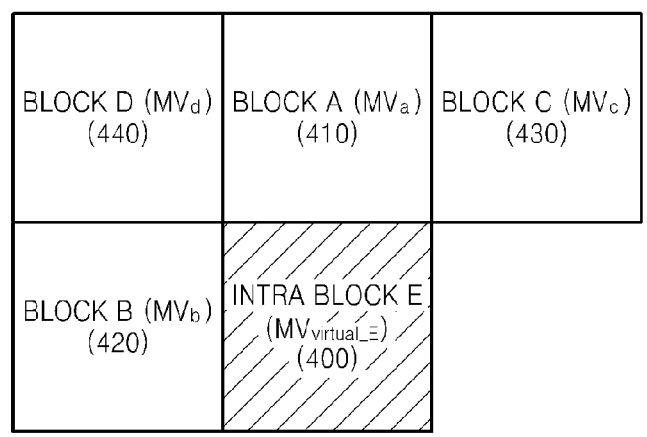
FIG. 4 is a diagram illustrating another example of generating a virtual motion vector assigned to an intra block according to an exemplary embodiment of the present invention.

FIG. 4 is a diagram illustrating another example of generating a virtual motion vector assigned to an intra block according to an exemplary embodiment of the present invention. In FIG. 4, reference number 400 indicates an intra block E 400 which is currently encoded by using intra prediction, and each of blocks A through D 410 through 440 neighboring the intra block E 400 may each be any one of an inter block and an intra block. An inter block in the blocks A through D has a motion vector which is generated through a related art motion prediction process performed in the prediction image generation unit 210. An intra block in the blocks A through D has a virtual motion vector which is determined through a motion prediction process using a neighboring area, as explained above with reference to FIG. 3, or a virtual motion vector which is predicted by using motion vectors of neighboring blocks as will be explained with reference to FIG. 4.

Referring to FIG. 4, as a virtual motion vector ($MV_{virtual}$) of the intra block E 400, the virtual motion vector generation unit 280 can use a result obtained by substituting motion vectors ($MV_a$, $MV_b$, $MV_c$, and $MV_d$) of the neighboring blocks A through D 410 through 440, in a predetermined function (F) as equation 1 below:

$$MV_{virtual\,E} = F(MV_a, MV_b, MV_c, MV_d) \qquad (1)$$

The predetermined function (F) may be a function for obtaining a median value or mean value from motion vectors ($MV_a$, $MV_b$, $MV_c$, and $MV_d$) of the neighboring blocks A through D 410 through 440, or a function for multiplying each of the motion vectors ($MV_a$, $MV_b$, $MV_c$, and $MV_d$) by a predetermined weight and adding the results as equation 2 below:

$$MV_{virtual\,E} = (\alpha \cdot MV_a + \beta \cdot MV_b + \sigma \cdot MV_c + \delta \cdot MV_d \qquad (2)$$

As described above, when an intra block is included in the neighboring blocks A through D 410 through 440, a virtual motion vector of the intra block is used as a motion vector in equations 1 and 2. Also, when a virtual motion vector of an intra block is generated, neighboring blocks and the number of motion vectors that are used may be changed. A virtual motion vector of a current block is generated by using motion vectors of a block above the current block, a block to the left of the current block, and a block above and to the right of the current block, which are used when a motion vector is predicted according to the H.264 standard draft. Also, if an intra block exists among the neighboring blocks, a virtual motion vector of the intra block is used as the motion vector of the intra block, thereby generating the virtual motion vector of the current intra block in a manner similar to the motion vector prediction process of the H.264 standard draft.

Referring again to FIG. 2, if a block which is currently being encoded is an inter block, the motion vector information generation unit 290 generates motion information, including motion vector information of the inter block and reference frame information. As described above, in the case of an inter block, the motion vector of the inter block as well as prediction error data should be encoded and transmitted to a decoding end so that the decoding end can perform motion compensation. In order to improve compression efficiency, motion vector information is not directly encoded and transmitted, but only the differential value between the motion vector and a prediction motion vector predicted from the motion vector or virtual motion vector of neighboring blocks is inserted as motion information into a bitstream. For this, the motion vector information generation unit 290 generates the prediction motion vector of the inter block, by using the motion vectors of neighboring blocks, and calculates and outputs the difference value between the prediction motion vector and the original motion vector of the inter block.

Figure 5:
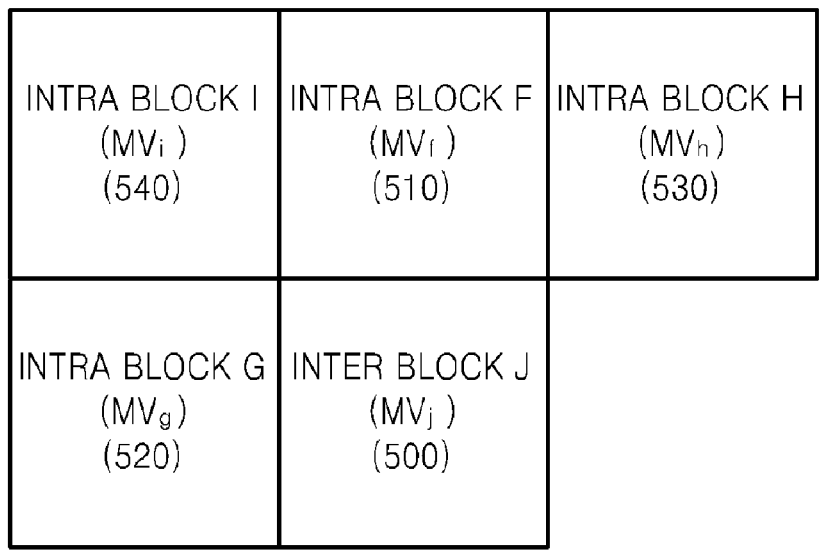
FIG. 5 is a diagram illustrating a process of predicting a motion vector of an inter block by using a virtual motion vector of a neighboring intra block according to an exemplary embodiment of the present invention.

FIG. 5 is a diagram illustrating a process of predicting a motion vector of an inter block by using a virtual motion vector of a neighboring intra block according to an exemplary embodiment of the present invention.

Referring to FIG. 5, in order to encode a motion vector $MV_j$ which is generated in the prediction image generation unit 210 by performing motion prediction in relation to inter block J 500, first, a prediction motion vector $MV_j'$ of the inter block J 550 should be generated from motion vectors of blocks neighboring the inter block J 500. In particular, since a virtual motion vector is also generated and assigned to an intra block in the virtual motion vector generation unit 280 described above, according to an exemplary embodiment of the present invention, even when an intra block is included in the blocks neighboring the inter block, a prediction motion vector of the inter block can be generated in the same manner as that of generating a prediction motion vector in the H.264 standard draft.

In FIG. 5, assuming that a virtual motion vector of an intra block F 510 is $MV_f$, a virtual motion vector of an intra block G 520 is $MV_g$, and a virtual motion vector of an intra block H 530 is $MV_h$, the motion vector information generation unit 290 determines an average of the virtual motion vectors $MV_f$, $MV_g$, and $MV_h$ as a prediction motion vector $MV_j'$ of the inter block J 500, and generates and outputs the differential value ($MV_j - MV_j'$) between the original vector $MV_j$ and the prediction motion vector $MV_j'$. Meanwhile, in addition to the method of generating a prediction motion vector of an inter block according to the H.264 standard draft, the motion vector information generation unit 290 can generate a prediction motion vector, by using a modified method using motion information, including a virtual motion vector of a neighboring block.

Referring again to FIG. 2, the bitstream generation unit 240 entropy-encodes a quantized prediction error, and generates a bitstream, by adding a motion vector differential value, reference frame information and an encoding mode, which are input from the motion vector information generation unit 290.

Figure 6:
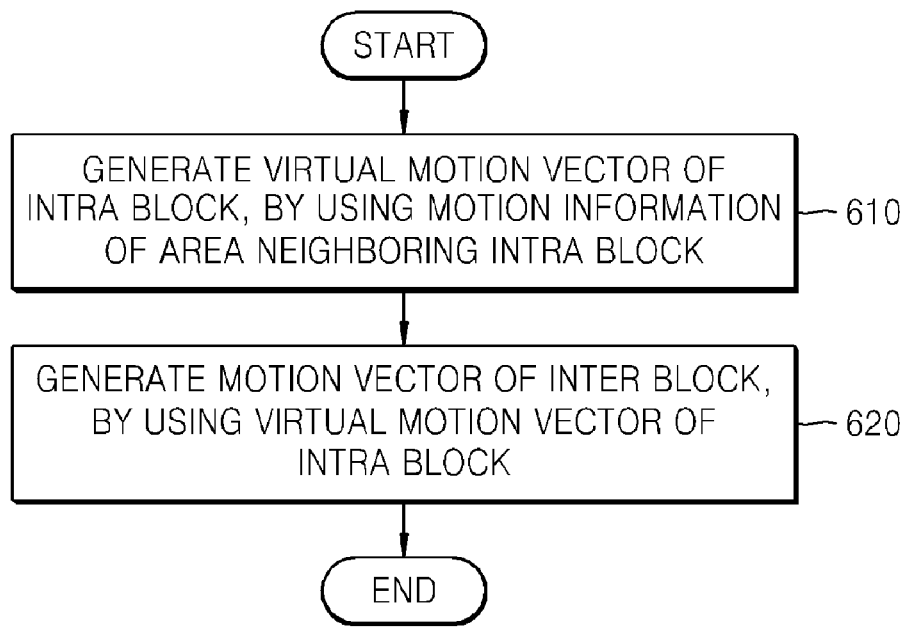
FIG. 6 is a flowchart illustrating a method of encoding an image according to an exemplary embodiment of the present invention.

FIG. 6 is a flowchart illustrating a method of encoding an image according to an exemplary embodiment of the present invention.

Referring to FIG. 6, in operation 610, a virtual motion vector which is to be assigned to an intra block is generated by using motion information of an area neighboring the intra block. As described above, a motion vector which is generated as a result of motion estimation of the area neighboring the intra block may be directly used, or a value generated through a predetermined function using motion vectors of blocks neighboring the intra block can be used as the virtual motion vector of the intra block.

In operation 620, in order to encode motion vector information of an inter block, the motion vector of the inter block is predicted by using motion vectors of neighboring blocks, including the virtual motion block of the intra block. Then, the differential value between the original motion vector of the inter block and the prediction motion vector is generated, and motion information of the inter block is added, thereby generating a bitstream.

Figure 7:
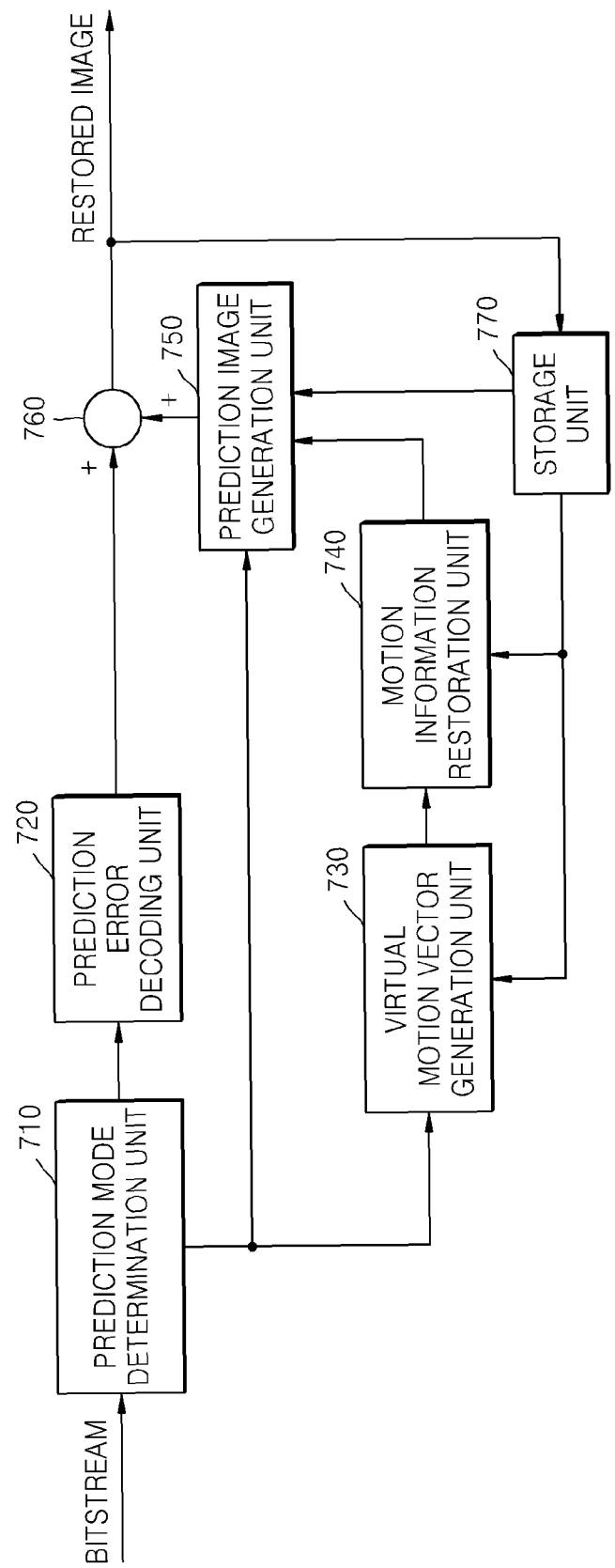
FIG. 7 is a block diagram illustrating a structure of an apparatus for decoding an image according to an exemplary embodiment of the present invention.

FIG. 7 is a block diagram illustrating a structure of an apparatus for decoding an image according to an exemplary embodiment of the present invention.

Referring to FIG. 7, the apparatus for decoding an image includes a prediction mode determination unit 710, a prediction error decoding unit 720, a virtual motion vector generation unit 730, a motion information restoration unit 740, a prediction image generation unit 750, an addition unit 760, and a storage unit 770.

The prediction mode determination unit 710 reads prediction mode information in a bitstream and determines whether a block which is being currently encoded is a block encoded in intra prediction mode or inter prediction mode.

The prediction error decoding unit 720 performs entropy decoding, inverse quantization and inverse transform, thereby restoring a residue which is a prediction error between an input block at the time of encoding and a prediction block which is generated by intra prediction or inter prediction.

The virtual motion vector generation unit 730 generates a virtual motion vector, by using motion information of an area neighboring an intra block. The operation of the motion vector generation unit 730 illustrated in FIG. 7 is similar to that of the virtual motion vector generation unit 280 illustrated in FIG. 2. That is, a motion vector which is generated by performing motion estimation in relation to an area neighboring an intra block, by using reference data which is previously decoded and stored in the storage unit 770 may be determined as a virtual motion vector, or a vector value which is generated by substituting motion vectors of blocks neighboring the intra block which are decoded before the intra block, in a predetermined function may be determined as a virtual motion vector.

If an intra block exists adjacent to an inter block, in order to restore motion information of the inter block, the motion information restoration unit 740 predicts a prediction motion vector of the inter block, by using motion vectors of blocks neighboring the inter block, including a virtual motion vector of the intra block which is generated in the virtual motion vector generation unit 730. Then, by adding the difference value between the motion vector of the inter block and the prediction motion vector, to the prediction motion vector, the motion information restoration unit 740 restores the motion vector of the inter block.

When the block being currently decoded is an intra block, the prediction image generation unit 750 generates a prediction block from neighboring pixels in the same picture, which are decoded and stored previously. Also, when the block being currently decoded is an inter block, the prediction image generation unit 750 generates a prediction block, by motion compensation obtaining data of a reference picture indicated by the motion vector of the inter block restored in the motion information generation unit 740.

The addition unit 760 adds the prediction image generated in the prediction image generation unit 750 by intra prediction or motion compensation, to a prediction error restored in the prediction error decoding unit 720, thereby restoring an image. The restored image is stored in the storage unit 770 for decoding of a next picture.

Figure 8:
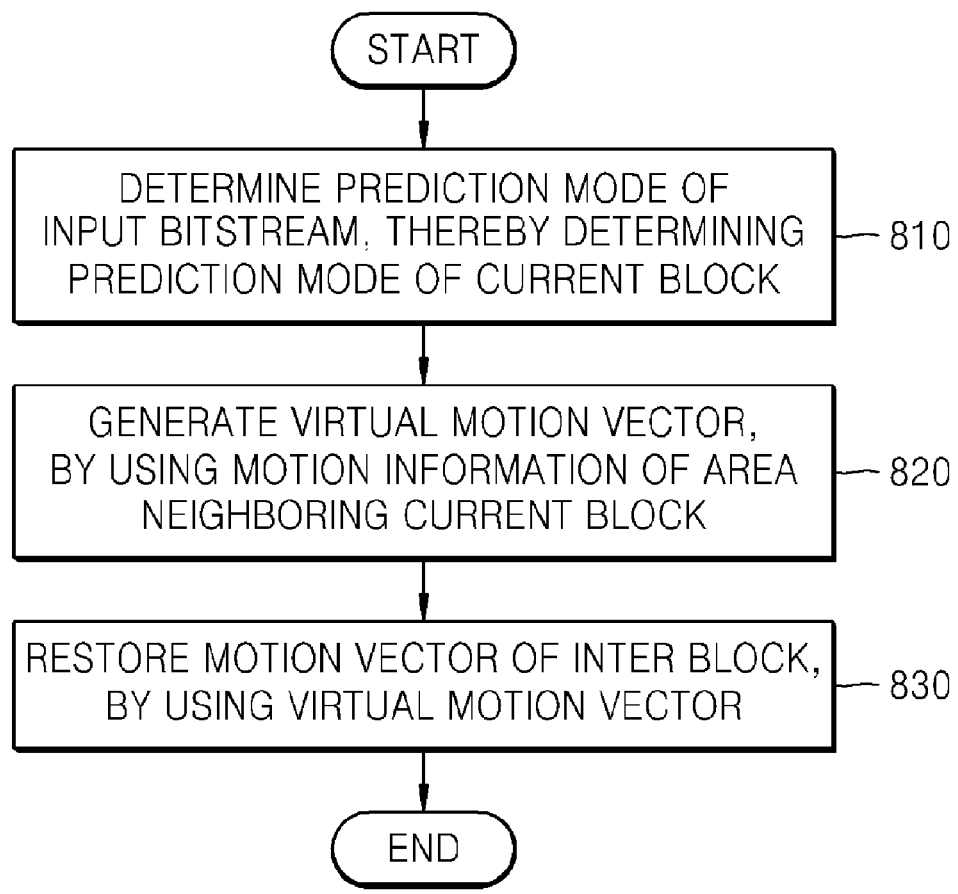
FIG. 8 is a flowchart illustrating a method of decoding an image according to an exemplary embodiment of the present invention.

FIG. 8 is a flowchart illustrating a method of decoding an image according to an exemplary embodiment of the present invention.

Referring to FIG. 8, in operation 810, prediction mode information in an input bitstream is extracted and the prediction mode of a current block to be decoded is determined.

In operation 820, if the current block being decoded is an intra block, a virtual motion vector is generated by using motion information of an area neighboring the intra block, and is assigned to the intra block.

In operation 830, if an intra block is included in neighboring blocks which are decoded before an inter block, a motion vector of the inter block is predicted by using motion vector information of the neighboring blocks, including a virtual motion vector of the intra block, and the prediction motion vector of the inter block and a motion vector differential value in the bitstream area are added, thereby restoring the motion vector of the inter block. By using the restored motion vector of the inter block, motion compensation of the inter block is performed, thereby generating a prediction block. By adding the prediction block to a restored prediction error, an image is restored.

According to the present invention as described above, even when an intra block exists in the vicinity of an inter block, a motion vector of the inter block can be efficiently predicted, thereby improving the compression efficiency of an image.

The exemplary embodiments of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to the exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of encoding an image comprising:
   generating a virtual motion vector of an intra block which is in a current frame and is encoded by intra prediction, by using motion information of an area neighboring the intra block; and
   encoding a motion vector of an inter block which is in the current frame and is encoded by inter prediction after the intra block is encoded, by using the virtual motion vector of the intra block in the current frame,
   wherein the encoding of the motion vector of the inter block comprises:
   generating a prediction motion vector of the inter block, by using motion vectors of blocks neighboring the inter block; and
   encoding a difference value between the prediction motion vector and the motion vector of the inter block,
   wherein in the encoding of the motion vector of the inter block, if the intra block is included in the blocks neighboring the inter block, the virtual motion vector of the intra block is used in the generating of the prediction motion vector of the inter block.

2. The method of claim 1, wherein the generating of the virtual motion vector of the intra block comprises:
   performing motion estimation of the area neighboring the intra block to determine motion vector of the neighboring area; and
   determining the virtual motion vector of the intra block as a motion vector of the neighboring area.

3. The method of claim 1, wherein in the generating of the virtual motion vector of the intra block, a vector generated by substituting the motion vectors of blocks neighboring the intra block, in a given function, is determined as the virtual motion vector of the intra block.

4. The method of claim 3, wherein the given function outputs an average of the motion vectors of the blocks neighboring the intra block.

5. The method of claim 3, wherein the given function outputs a weighted sum which is obtained by multiplying each of the motion vectors of the blocks neighboring the intra block by given weights, and summing up the multiplication results.

6. The method of claim 1, wherein the area neighboring the intra block comprises at least one block which is encoded and restored before the intra block is encoded.

7. An apparatus for encoding an image comprising:
a virtual motion vector generation unit that generates a virtual motion vector of an intra block which is in a current frame and is encoded by intra prediction, by using motion information of an area neighboring the intra block; and
a motion vector information generation unit that encodes a motion vector of an inter block which is in the current frame and is encoded by inter prediction after encoding the intra block, by using the virtual motion vector of the intra block in the current frame,
wherein the motion vector information generation unit comprises:
a prediction motion vector generation unit that generates a prediction motion vector of the inter block, by using motion vectors of blocks neighboring the inter block; and
a subtraction unit that calculates a difference value between the prediction motion vector and the motion vector of the inter block,
wherein if the intra block is included in the blocks neighboring the inter block, the prediction motion vector generation unit uses the virtual motion vector of the intra block in the generating the prediction motion vector of the inter block.

8. The apparatus of claim 7, wherein the virtual motion vector generation unit performs motion estimation of the area neighboring the intra block and determines the virtual motion vector of the intra block as a motion vector of the neighboring area.

9. The apparatus of claim 7, wherein the virtual motion vector generation unit determines a vector generated by substituting the motion vectors of blocks neighboring the intra block, in a given function, as the virtual motion vector of the intra block.

10. A method of decoding an image comprising:
obtaining prediction mode information in an input bitstream and determining a prediction mode of a current block which is in a current frame and is being decoded;
if the determination result indicates that the current block is an intra block encoded by intra prediction, generating a virtual motion vector of the current block, by using motion information of an area neighboring the current block; and
restoring an inter block which is in the current frame and is decoded by inter prediction after the current block is decoded, by using the virtual motion vector of the current block in the current frame,
wherein the restoring of the inter block comprises:
generating a prediction motion vector of the inter block, by using motion vectors of blocks neighboring the inter block; and
decoding the motion vector of the inter block, by adding the prediction motion vector and a difference value of the motion vector of the inter block in the bitstream,
wherein in the generating of the prediction motion vector of the inter block, if the intra block is included in the blocks neighboring the inter block, the virtual motion vector of the intra block is used in the generating of the prediction motion vector of the inter block.

11. The method of claim 10, wherein the generating of the virtual motion vector of the current block which is determined as the intra block comprises:
performing motion estimation of the area neighboring the current block which is decoded before the current block; and
determining the virtual motion vector of the current block as the motion vector of the neighboring area.

12. The method of claim 10, wherein in the generating the virtual motion vector of the current block which is determined as the intra block, a vector generated by substituting the motion vectors of blocks neighboring the current block in a given function is determined as the virtual motion vector of the intra block.

13. The method of claim 12, wherein the given function outputs an average of the motion vectors of the blocks neighboring the intra block.

14. The method of claim 12, wherein the given function outputs a weighted sum which is obtained by multiplying each of the motion vectors of the blocks neighboring the current block by given weights, and summing up the multiplication results.

15. An apparatus for decoding an image comprising:
a prediction mode determination unit that obtains prediction mode information in an input bitstream and determines a prediction mode of a current block which is in a current frame and is being decoded;
a virtual motion vector generation unit that generates, if the determination result indicates that the current block is an intra block encoded by intra prediction, a virtual motion vector of the current block, by using motion information of an area neighboring the current block; and
a motion information restoration unit that restores an inter block which is in the current frame and is decoded by inter prediction after the current block is decoded, by using the virtual motion vector of the current block in the current frame,
wherein the motion information restoration unit comprises:
a prediction motion vector generation unit that generates a prediction motion vector of the inter block, by using motion vectors of blocks neighboring the inter block; and
an addition unit that restores the motion vector of the inter block, by adding the prediction motion vector and a difference value of the motion vector of the inter block in the bitstream,
wherein if the intra block is included in the blocks neighboring the inter block, the prediction motion vector generation unit uses the virtual motion vector of the intra block in the generating of the prediction motion vector of the inter block.

16. The apparatus of claim 15, wherein the virtual motion vector generation unit performs motion estimation of the area neighboring the current block which is decoded before the current block, and determines the virtual motion vector of the current block as the motion vector of the neighboring area.

17. The apparatus of claim 15, wherein the virtual motion vector generation unit determines a vector generated by substituting motion vectors of blocks neighboring the current block in a given function, as the virtual motion vector of the intra block.

* * * * *